H. T. REEVE.
EYE PROTECTOR.
APPLICATION FILED OCT. 24, 1917.
1,298,092.  Patented Mar. 25, 1919.
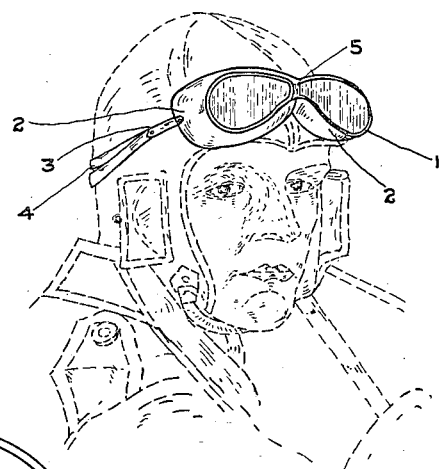
FIG. I
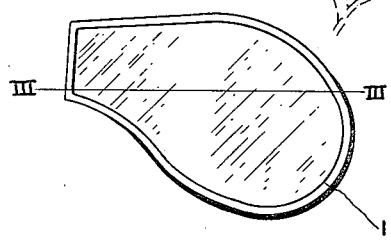
FIG. II
FIG. III
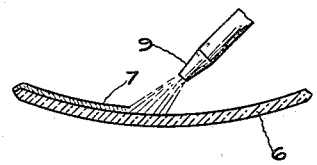
FIG. IV
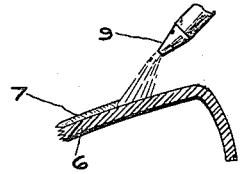
FIG. V
FIG. VI
INVENTOR
HOWARD T. REEVE
BY
H. H. Styll, H. H. Parsons
ATTORNEYS

UNITED STATES PATENT OFFICE.

HOWARD T. REEVE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,298,092.   Specification of Letters Patent.   Patented Mar. 25, 1919.

Application filed November 24, 1917.   Serial No. 203,754.

*To all whom it may concern:*

Be it known that I, HOWARD T. REEVE, of Southbridge, in the county of Worcester and State of Massachusetts, have invented certain new and useful Improvements in Eye-Protectors, of which the following is a specification.

This invention relates to improvements in eye protectors, and has particular reference to a new and improved form of transparent visual member for use in devices of this character and to a novel and improved means of forming such visual member.

One of the leading objects of the present invention is the provision of an improved reinforced lens or visual member particularly adapted for use in goggles or eye protectors for aviators or the like which will be so constructed as to bind the lens together and prevent flying particles of glass entering the eye.

A further object of the present invention is the provision of an improved lens or the like whereby an extremely desirable transparent visual member is obtained having substantially the transparence and surfaces of a polished member such as glass combined with the toughness or infrangibility of mica, celluloid or similar substances and which will therefore afford perfect vision combined with safety of the eye from flying particles either of the lens itself or from particles not having great striking velocity piercing the lens.

Other objects and advantages of my improved construction should be readily understood by reference to the following specification taken in connection with the accompanying drawings, and it will be understood that I may make any modifications in the specific details of construction shown and described within the scope of the appended claims without departing from or exceeding the spirit of my invention.

Figure I represents a view of my improved construction in use.

Fig. II represents a detailed view of one of my lenses.

Fig. III represents a sectional view thereof on the line III—III of Fig. II.

Fig. IV represents a view illustrating the forming of my improved visual member.

Fig. V is a similar view illustrating the formation of a modified form thereof, and Fig. VI represents a sectional view of another modification.

In the drawings, in which similar characters of reference are employed to denote corresponding parts throughout the several views, the numeral 1 denotes the frame in which my improved lenses are held, said frame in the particular style illustrated having the side shields 2 to fit against the face of the wearer and being further provided with the short temple members 3 to which are secured the ends of the head band 4 for retaining the frame in position on the face of the wearer, there preferably being a pair of the lens frames centrally connected as by the bridge member 5 to permit the frame to automatically fit itself to the face of the wearer without any special adjustments.

It will be noted by reference to the drawing that my improved protection lens is especially adapted for use in eye protectors for aviators or the like where the wearer requires as perfect vision as possible and yet a lens which will be relatively infrangible and which if struck will not fly off in particles liable to pierce and injure the eye, but which on the other hand will not only itself cling together and not shatter but which will resist accidental piercing and will tend to stop such particles and prevent their striking the eye of the wearer.

In the accomplishment of these results, I have provided an improved lens preferably comprising a transparent member 6 of glass or similar material which may if desired be polished to an extremely smooth surface, while combined with said hard transparent member is a film, layer or coating also of transparent but of flexible or non-frangible material which will resist breakage or piercing. This film or layer 7 may be placed on the eye side only of the lens in order to hold the fragments of the lens proper together if shattered and prevent flying chips from breaking off the rear face and striking the eye, or may be placed on both the inner and outer faces if preferred, one form being illustrated in Fig. III while the other form is shown in Fig. VI. In either event it is to be noted that the layer 7 extends not only over the exposed face of the lens, but also as particularly illustrated in connection with Fig. VI extends around the beveled or frame engaging edge 8 of the lens and fits between the lens and the encircling frame 1 forming a sort of cushioning member to allow the lens to yield slightly under shocks thereagainst, lessening the liability of breakage or of piercing if the object striking the lens should break it and at the same time somewhat relieving the face of the entire shock against the frame in that the shock has been absorbed to a certain degree before it is imparted to the frame.

The manner of forming my improved visual member or lens has been particularly illustrated in connection with Figs. IV and V, alternative methods being contrastingly illustrated in the said figures. In Fig. IV I have shown the glass or like base member 6 as having deposited thereon in a soft or molten condition as in a spray the material intended to form the film 7, said spray issuing as from the nozzle 9. On the other hand, in the form shown in Fig. V, I have illustrated the member 6 as providing the base and being bent into desired shape as shown to form both a front and a side lens member, and the spray from the nozzle 9 in this instance bearing and depositing upon the glass 6 the material 7 to build up the lens proper in desired shape on the glass 6 as the base. In either event, however, the result is the same, that is to say, that on account of the softened or melted spray being forcibly directed against the base member the material of the spray will be smoothly and evenly deposited on said base member and will so mechanically sink into the pores thereof or interlock therewith as to form a substantially integral mass in which the base member and the deposited member are firmly connected one to the other without the use of cement or other attaching mediums.

I claim:—

1. In an eye protector, the combination with a frame, of a visual member mounted in the frame and comprising a compound member made up of a frangible and a nonfrangible co-extensive part, one of said parts being formed on the other, the infrangible member extending between the frangible member and the frame to form a cushioning member, substantially as and for the purpose described.

2. A protection lens comprising a polished transparent base and a flexible reinforcement therefor formed thereon, said reinforcement extending over the edges of the lens to provide a cushion between the lens and frame when it is mounted.

3. The combination with a transparent base member, of a second transparent visual member formed thereon and extending over the edges of the base member, as and for the purpose set forth.

In testimony whereof I have affixed my signature, in presence of two witnesses.

HOWARD T. REEVE.

Witnesses:
H. E. COLEMAN,
H. K. PARSONS.